United States Patent
Lin et al.

(10) Patent No.: US 8,804,922 B2
(45) Date of Patent: Aug. 12, 2014

(54) VOICE COMMUNICATIONS METHOD

(75) Inventors: Chung-Yang Lin, Hangzhou (CN); Yan Long Sun, Hangzhou (CN); HongYan Zhao, Hangzhou (CN)

(73) Assignee: ArcSoft (Hangzhou) Multimedia Technology Co., Ltd., Tiantang Software Park, Hangzhou, Zhejiang Province (CN)

(*) Notice: Subject to any disclaimer, the term of this patent is extended or adjusted under 35 U.S.C. 154(b) by 91 days.

(21) Appl. No.: 13/523,891

(22) Filed: Jun. 15, 2012

(65) Prior Publication Data

US 2013/0336464 A1 Dec. 19, 2013

(51) Int. Cl.
*H04M 1/64* (2006.01)
(52) U.S. Cl.
USPC ............... 379/88.22; 379/211.02; 379/212.01
(58) Field of Classification Search
USPC ................ 379/211.02, 88.22, 215.01, 212.01
See application file for complete search history.

(56) References Cited

U.S. PATENT DOCUMENTS

| | | | |
|---|---|---|---|
| 2003/0119487 A1* | 6/2003 | Silvester | 455/412 |
| 2004/0156493 A1* | 8/2004 | Cohen | 379/207.04 |
| 2007/0298711 A1* | 12/2007 | Ogushi | 455/39 |
| 2008/0076471 A1* | 3/2008 | Yuki | 455/556.1 |

* cited by examiner

*Primary Examiner* — Fan Tsang
*Assistant Examiner* — Simon King
(74) *Attorney, Agent, or Firm* — Winston Hsu; Scott Margo

(57) ABSTRACT

A first electronic device makes a phone call to a second electronic device. The second electronic device issues an incoming call notification to a third electronic device. The third electronic device sends a response to the second electronic device. The second electronic device answers the phone call. The first electronic device sends first voice to the second electronic device. The second electronic device transfers the first voice to the third electronic device. The third electronic device plays the first voice. The third electronic device transfers second voice to the second electronic device. The second electronic device sends the second voice to the first electronic device.

13 Claims, 3 Drawing Sheets

VOICE COMMUNICATIONS METHOD

BACKGROUND OF THE INVENTION

1. Field of the Invention

The present invention is related to a voice communications method, and more particularly, to a method capable of transferring a phone call from one electronic device to other electronic devices over a local area network or the internet.

2. Description of the Prior Art

With the increasing popularity of mobile phones, people are becoming more dependent on mobile phones to communicate with each other. However, people may sometimes forget to bring their phones with them or leave their phones in places inconvenient for them to reach, causing people to miss phone calls which may be important to them. In such case, people may call back by dialing the phone number of missed calls displayed on their phones, however there are disadvantages thereof. One disadvantage is that the extension of a phone number cannot be displayed, and the other disadvantage is that people may wonder if they need to call back because the missed phone calls may be unwanted calls.

Although mobile phone carriers provide service to transfer phone calls from one phone to another phone for a same user, fees are usually charged for this kind of service. Besides, some people may not have other phones to which phone calls may be transferred and this kind of service is useless to them.

SUMMARY OF THE INVENTION

An embodiment of the present invention discloses a voice communications method. The method comprises a first electronic device making a phone call to a second electronic device, the second electronic device issuing an incoming call notification to a third electronic device when the second electronic device fails to respond to the first electronic device after a predetermined time length, the third electronic device sending a response to the second electronic device, the second electronic device answering the phone call from the first electronic device, the first electronic device sending voice to the second electronic device, recording the voice sent from the first electronic device to the second electronic device to generate first recorded voice, encoding the first recorded voice to generate first encoded voice, the second electronic device transferring the first encoded voice to the third electronic device, the third electronic device decoding the first encoded voice to generate first decoded voice and playing the first decoded voice after the third electronic device receives the first encoded voice, recording voice received from a microphone of the third electronic device to generate second recorded voice, encoding the second recorded voice to generate second encoded voice, the third electronic device transferring the second encoded voice to the second electronic device, the second electronic device decoding the second encoded voice to generate second decoded voice, and the second electronic device sending the second decoded voice to the first electronic device.

The present invention provides a voice communications method capable of transferring a phone call from one electronic device to other electronic devices over a local area network or the internet so that a user can answer the phone call on one of the other electronic devices available to the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
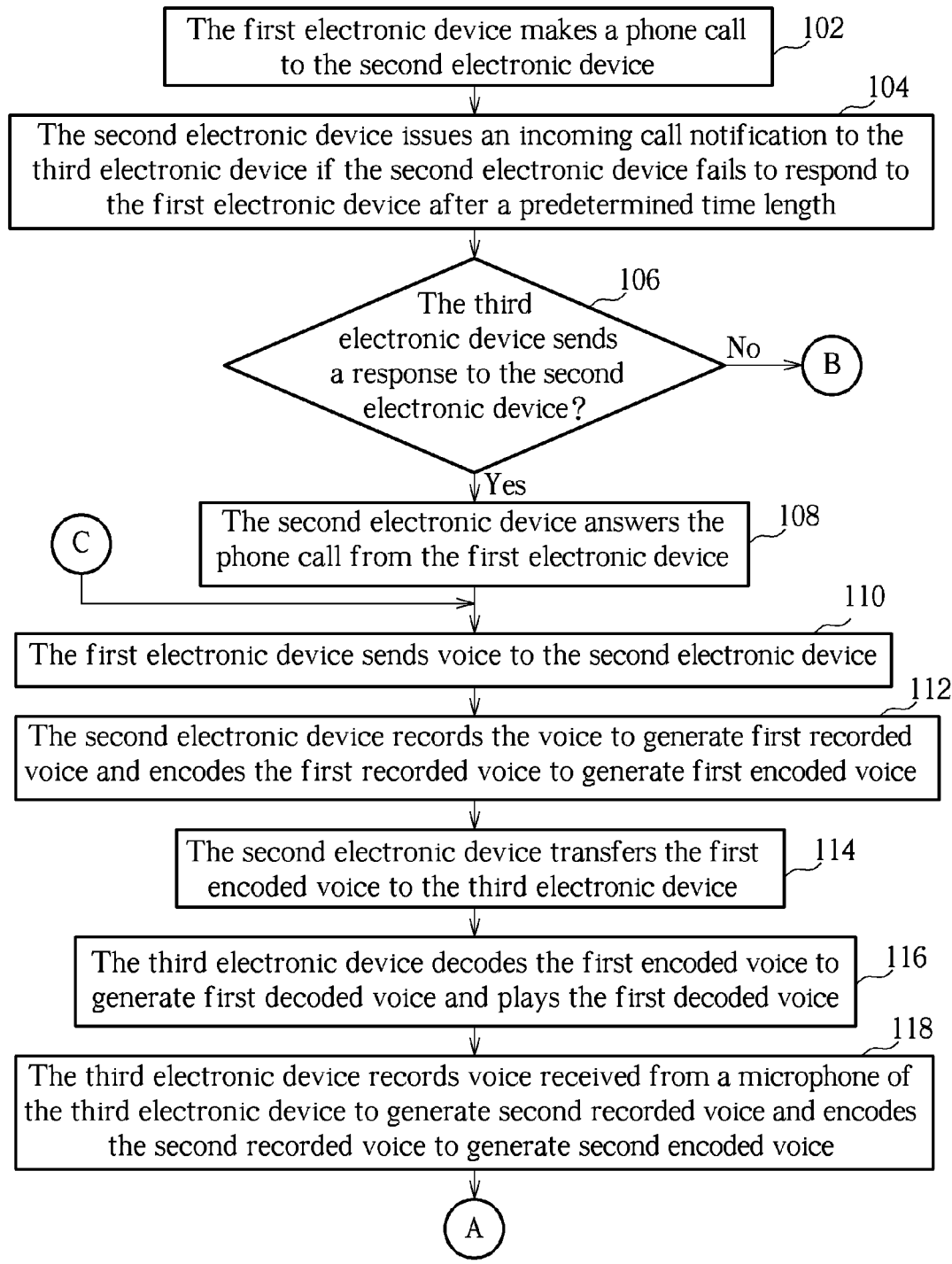
FIGS. 1A and 1B are flowcharts illustrating a voice communications method according to an embodiment of the present invention.
Figure 1B:
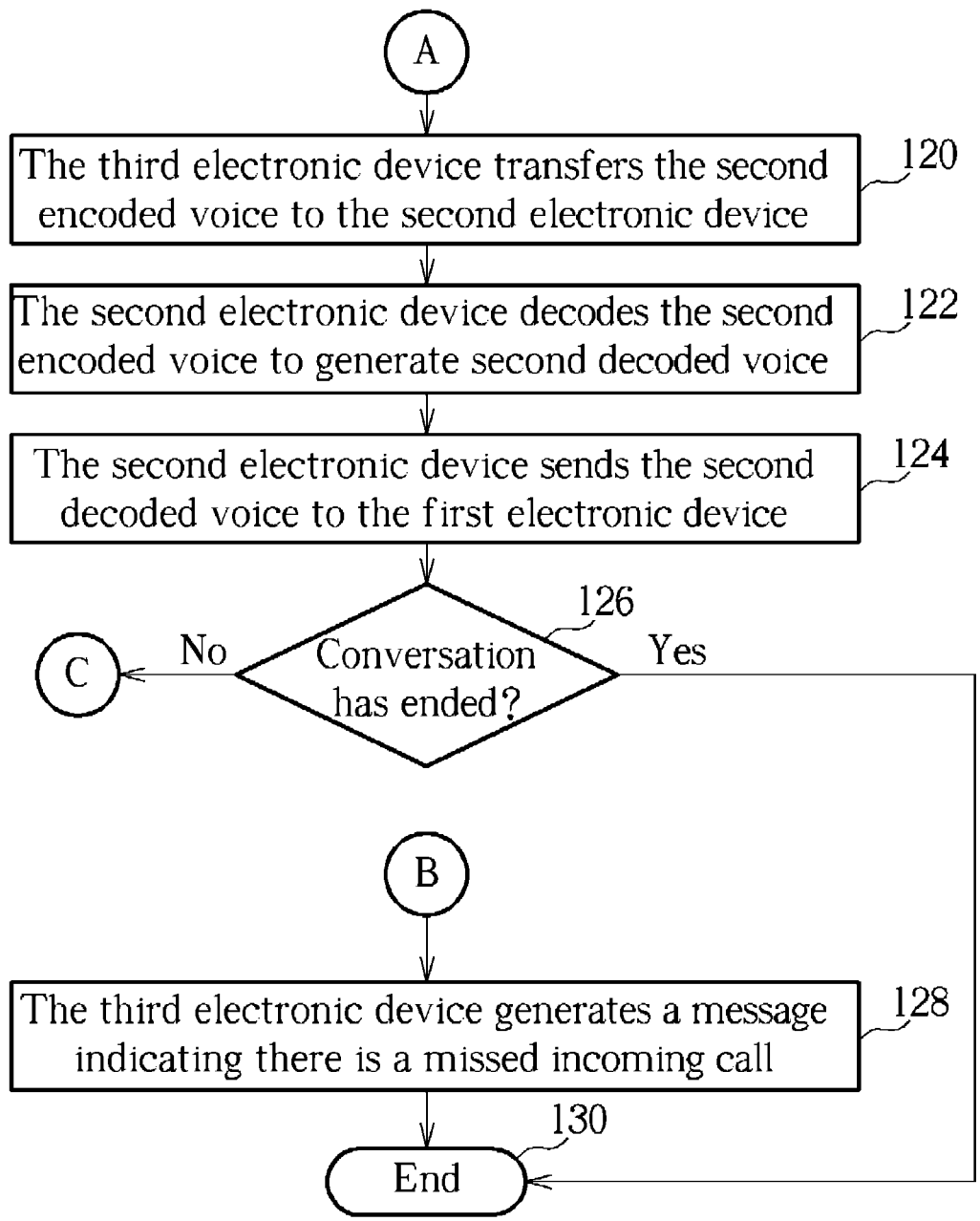
Figure 2:
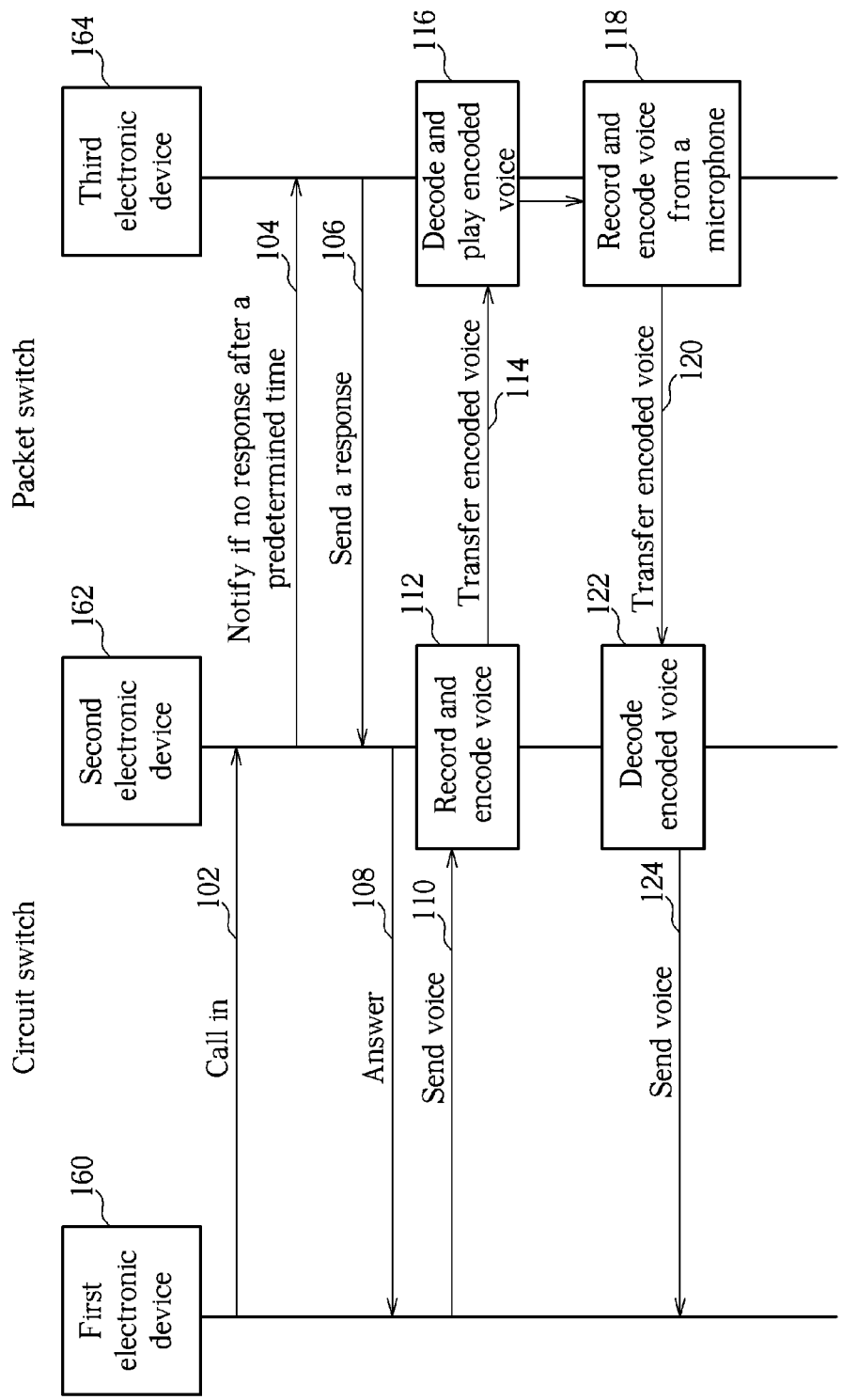
FIG. 2 illustrates the voice communications method according to FIGS. 1A and 1B.

Please refer to FIGS. 1A, 1B and FIG. 2, FIGS. 1A and 1B are flowcharts illustrating a voice communications method 100 according to an embodiment of the present invention. FIG. 2 illustrates the voice communications method 100 according to FIGS. 1A and 1B. The method 100 may be performed among a first, a second and a third electronic device, 160, 162, and 164. The first electronic device 160 may be a mobile phone or a landline connected via a circuit switched network. The second electronic device 162 may be a mobile phone running first application software that can communicate with the third electronic device 164. The third electronic device 164 may be a mobile phone, a tablet computer, a personal computer, a smart television, or other electronic devices, without limitation thereto, running second application software that can communicate with the second electronic device 162. The third electronic device 164 may be equipped with a microphone and a speaker to record and play voice. The method 100 may include following steps:

Step 102: The first electronic device 160 makes a phone call to the second electronic device 162;

Step 104: The second electronic device 162 issues an incoming call notification to the third electronic device 164 if the second electronic device 162 fails to respond to the first electronic device 160 after a predetermined time length;

Step 106: If the third electronic device 164 sends a response to the second electronic device 162, perform step 108; else perform step 128;

Step 108: The second electronic device 162 answers the phone call from the first electronic device 160;

Step 110: The first electronic device 160 sends voice to the second electronic device 162;

Step 112: The second electronic device 162 records the voice to generate first recorded voice and encodes the first recorded voice to generate first encoded voice;

Step 114: The second electronic device 162 transfers the first encoded voice to the third electronic device 164;

Step 116: The third electronic device 164 decodes the first encoded voice to generate first decoded voice and plays the first decoded voice;

Step 118: The third electronic device 164 records voice received from a microphone of the third electronic device 164 to generate second recorded voice and encodes the second recorded voice to generate second encoded voice;

Step 120: The third electronic device 164 transfers the second encoded voice to the second electronic device 162;

Step 122: The second electronic device 162 decodes the second encoded voice to generate second decoded voice;

Step 124: The second electronic device 162 sends the second decoded voice to the first electronic device 160;

Step 126: Repeat steps 110 to 124 until a conversation ends and go to step 130;

Step 128: The third electronic device 164 generates a message indicating there is a missed incoming call;

Step 130: End.

The phone call in step 102, 108, the voice in step 110, and the second decoded voice in step 124 are transmitted over the circuit switched network such as a PSTN (public switched telephone network), or are transmitted over a wireless network accessible to the PSTN. The first encoded voice in step 112 and the second encoded voice in step 118 may be in PCM (pulse code modulation) format. In another embodiment, the first encoded voice in step 112 and the second encoded voice in step 118 may be in AMR (Adaptive Multi-Rate) format.

To begin with, the user may install the first application software on the second electronic device 162 and install the second application software on the third electronic device 164. Next, the user may configure the second electronic device 162 and the third electronic device 164 with the corresponding software so that a communications link between the second electronic device 162 and the third electronic device 164 may be established. The communications link is established over a packet switched network such as a LAN (local area network) or the internet, and the incoming call notification in step 104, the response in step 106, the first encoded voice in step 114, and the second encoded voice in step 120 may be transmitted over the communications link thereafter. Internet protocols such as TCP/IP, UDP, or DLNA may be used for communication in the communications link.

After the communications link is established, if the second electronic device 162 is not available to the user when receiving the phone call, step 104 may be performed automatically to notify the user with the third electronic device 164 on hand. The incoming call notification in step 104 may be a message alert or a sound alert that notifies the user there is an incoming call. If the user decides to answer the incoming call after noticing the alert on the third electronic device 164, the user may control the third electronic device 164 to send the response to the second electronic device 162 by pressing a button or by other ways predetermined by the software, then step 106 to step 126 may be performed. If the user decides not to answer the incoming call or does not notice the incoming call notification, step 128 may be performed.

In another embodiment, the user may configure a plurality of third electronic devices. Each of the third electronic devices may communicate with the second electronic device 162 for receiving and answering the incoming call transferred from the second electronic device 162 over a local area network or the internet. The third electronic devices may be smart house appliances such as a smart TV or a smart refrigerator running the second application software that supports the call transfer function.

The present invention provides a voice communications method capable of transferring a phone call from one electronic device to other electronic devices over a local area network or the internet so that users can answer the incoming call on one of the other devices available to them. The advantages of the present invention include: the user can answer the incoming call on other devices even if the user does not have a phone on hand, the user can be notified of an incoming call even if the user's phone is in silent mode, and the transferring of the incoming call over the local area network or the internet is usually free of charge which reduces users' voice communications cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voice communications method comprising:
   a first electronic device making a phone call to a second electronic device;
   when the second electronic device fails to respond to the first electronic device after a predetermined time length, the second electronic device issuing an incoming call notification to a third electronic device;
   the third electronic device sending a response to the second electronic device after receiving the incoming call notification;
   the second electronic device answering the phone call from the first electronic device after receiving the response from the third electronic device;
   the first electronic device sending voice to the second electronic device;
   recording the voice sent from the first electronic device to the second electronic device to generate first recorded voice;
   encoding the first recorded voice to generate first encoded voice; and
   the second electronic device transferring the first encoded voice to the third electronic device;
   after the third electronic device receives the first encoded voice, the third electronic device decoding the first encoded voice to generate first decoded voice;
   playing the first decoded voice;
   recording voice received from a microphone of the third electronic device to generate second recorded voice;
   encoding the second recorded voice to generate second encoded voice; and
   the third electronic device transferring the second encoded voice to the second electronic device.

2. The method of claim 1 further comprising:
   after the second electronic device receives the second encoded voice from the third electronic device, the second electronic device decoding the second encoded voice to generate second decoded voice;
   the second electronic device sending the second decoded voice to the first electronic device.

3. The method of claim 1 wherein the first electronic device sending the voice to the second electronic device is the first electronic device sending the voice to the second electronic device over a circuit switched network.

4. The method of claim 3 wherein the circuit switched network is the PSTN (public switched telephone network).

5. The method of claim 1 wherein the second electronic device transferring the first encoded voice to the third electronic device is the second electronic device transferring the first encoded voice to the third electronic device over a packet switched network.

6. The method of claim 5 wherein the packet switched network is a LAN (local area network).

7. The method of claim 5 wherein the packet switched network is the internet.

8. The method of claim 1 wherein recording the voice sent from the first electronic device to the second electronic device is the second electronic device recording the voice sent from the first electronic device to the second electronic device.

9. The method of claim 1 wherein encoding the first recorded voice to generate the first encoded voice is the second electronic device encoding the first recorded voice to generate the first encoded voice.

10. The method of claim 1 wherein the first encoded voice is in PCM (pulse code modulation) format.

11. The method of claim 1 wherein the first encoded voice is in AMR (Adaptive Multi-Rate) format.

12. The method of claim 1 wherein the second encoded voice is in PCM format.

13. The method of claim 1 wherein the second encoded voice is in AMR format.

* * * * *

UNITED STATES PATENT AND TRADEMARK OFFICE
CERTIFICATE OF CORRECTION

| | | |
|---|---|---|
| PATENT NO. | : 8,804,922 B2 | Page 1 of 1 |
| APPLICATION NO. | : 13/523891 | |
| DATED | : August 12, 2014 | |
| INVENTOR(S) | : Chung-Yang Lin et al. | |

It is certified that error appears in the above-identified patent and that said Letters Patent is hereby corrected as shown below:

On the title page, item (73), correct the residence of the assignee from "Tiantang Software Park, Hangzhou City, Zhejiang Province, P.R.C." to --"Tiantang Software Park, 3 Xidoumen Road, Hangzhou City, Zhejiang Province, P.R.C."--.

Signed and Sealed this
Tenth Day of March, 2015

Michelle K. Lee
*Deputy Director of the United States Patent and Trademark Office*